United States Patent
Shao et al.

(10) Patent No.: US 9,288,259 B2
(45) Date of Patent: Mar. 15, 2016

(54) REMOTE DESKTOP SHARING FOR WIRELESS ENVIRONMENT

(71) Applicant: VMware, Inc., Palo Alto, CA (US)

(72) Inventors: Wenlong Shao, Beijing (CN); Kun Shi, Beijing (CN); Yueting Zhang, Beijing (CN); Bo Liu, Beijing (CN); Yuping Wei, Beijing (CN); Haiou Jiang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 322 days.

(21) Appl. No.: 13/929,818

(22) Filed: Jun. 28, 2013

(65) Prior Publication Data

US 2015/0003313 A1    Jan. 1, 2015

(51) Int. Cl.
G06F 15/16    (2006.01)
H04L 29/08    (2006.01)
H04W 4/08    (2009.01)
G06F 9/44    (2006.01)
G06F 9/455    (2006.01)
H04L 12/18    (2006.01)

(52) U.S. Cl.
CPC .............. H04L 67/10 (2013.01); G06F 9/4445 (2013.01); G06F 9/45558 (2013.01); H04L 12/1822 (2013.01); H04W 4/08 (2013.01); G06F 2009/45595 (2013.01); H04L 12/185 (2013.01); H04L 12/189 (2013.01)

(58) Field of Classification Search
CPC combination set(s) only.
See application file for complete search history.

(56) References Cited

U.S. PATENT DOCUMENTS

2009/0100349 A1    4/2009 Hancock

*Primary Examiner* — Saket K Daftuar

(57) ABSTRACT

A method is provided for a presenter device to screen share a remote desktop on a remote server with participant devices in a wireless network including the presenter device and the participant devices. The presenter device connects to the remote desktop through the wireless network. The presenter device receives screen data of the remote desktop and multicasts the screen data to a multicast group through the wireless network. The presenter device transmits a multicast address to the participant devices through the wireless network. The participant devices use the multicast address to receive the screen data through the wireless network.

20 Claims, 3 Drawing Sheets

REMOTE DESKTOP SHARING FOR WIRELESS ENVIRONMENT

BACKGROUND

In a meeting, a presenter may wish to share the screen of her computer with other participants. The presenter typically uses a projector to display her screen for all the participants to see.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In The Drawings

DETAILED DESCRIPTION

Sometimes a projector is not available in a conference room where a meeting is held. Sometimes a presenter does not have her computer with her at the meeting, but can access a remote desktop via a mobile device. Often a wireless network is available and meeting participants have portable wireless devices with them, such as smart phones and tablet computers. Thus, what are needed are method and apparatus for a presenter to screen share with other meeting participants under these conditions.

In accordance with examples of the present disclosure, a method is provided for a presenter device to screen share a remote desktop with participant devices through a wireless network. The presenter device connects to the remote desktop through the wireless network. The presenter device receives screen data of the remote desktop and multicasts the screen data to a multicast group through the wireless network. The participant devices find the presenter device through the wireless network and the presenter device transmits a multicast address to the participant devices through the wireless network. The participant devices use the multicast address to receive the multicast of the screen data through the wireless network.

Figure 1:
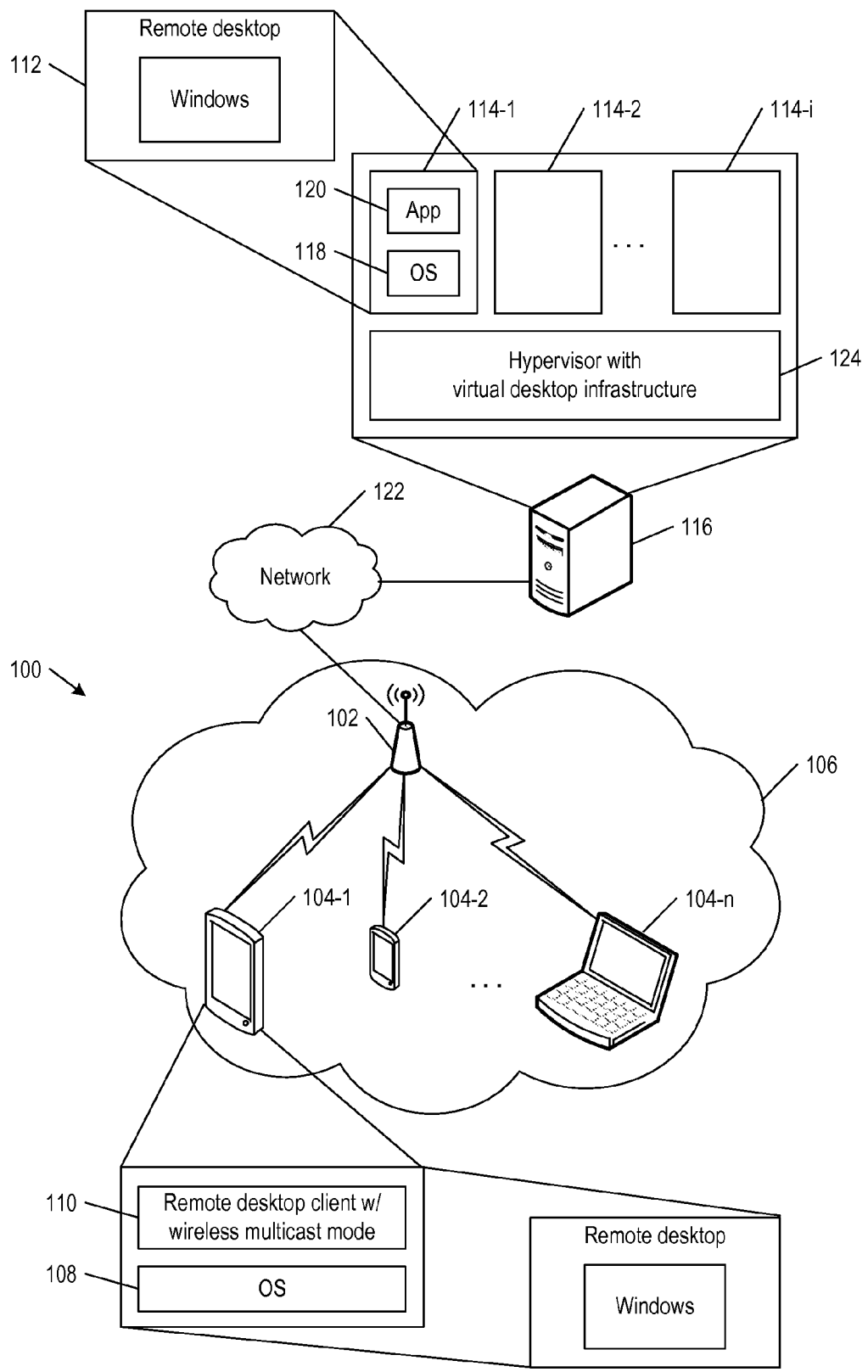
FIG. 1 is a block diagram illustrating a simplified view of a system to screen share a remote desktop on a virtual machine in a wireless environment in examples of the present disclosure.

FIG. 1 is a block diagram illustrating a simplified view of a system 100 in examples of the present disclosure. System 100 includes a wireless access point 102 and wireless devices 104-1, 104-2 . . . 104-n (collectively as "devices 104") connected to the wireless access point to form at least part of a wireless network 106. Wireless access point 102 may be a multicast enabled access point. Alternatively wireless access point 102 may also be a multicast enabled wireless router or a wireless adapter and a multicast enabled router. Devices 104 may be smart phones, tablet computers, and, in some cases, laptop computers. Devices 104 are used by participants in a meeting. For example, device 104-1 is a presenter device used by a presenter to screen share her remote desktop, and devices 104-2 to 104-n are participant devices used by participants of the meeting to participate in the screen sharing. Presenter device 104-1 includes an operating system (OS) 108 and a remote desktop client 110 running on the OS.

From presenter device 104-1, remote desktop client 110 allows a user to view and operate a remote desktop 112 on a virtual machine (VM) 114-1 at a remote computer 116 (e.g., a remote server). In addition, remote desktop client 110 has a wireless multicast mode to screen share remote desktop 112 with participant devices 114-2 to 114-n running the same application or a compatible wireless multicast application. VM 114-1 includes a guest OS 118 and an application 120, such as a slide presentation application.

Presenter device 104-1 is coupled to wireless access point 102 of wireless network 106, which is coupled by a network 122 (e.g., the Internet) to remote server 116. Remote server 116 runs a hypervisor 124 for virtual desktop infrastructure (VDI), including a connection broker (not shown) that manages the assignment of VMs 114-1, 114-2 . . . 114-i (collectively as "VMs 114") to remote users. Although illustrated here with remote desktop 112 implemented as a virtual machine in a VDI system, it should be recognized that remote desktop 112 may instead be a physical computer system, such as an office or home desktop that is accessed remotely.

Participant devices 104-2 to 104-n are each similarly configured as presenter device 104-1 with an OS and a remote desktop client application 110 or a compatible wireless multicast application running on the OS.

Figure 2:
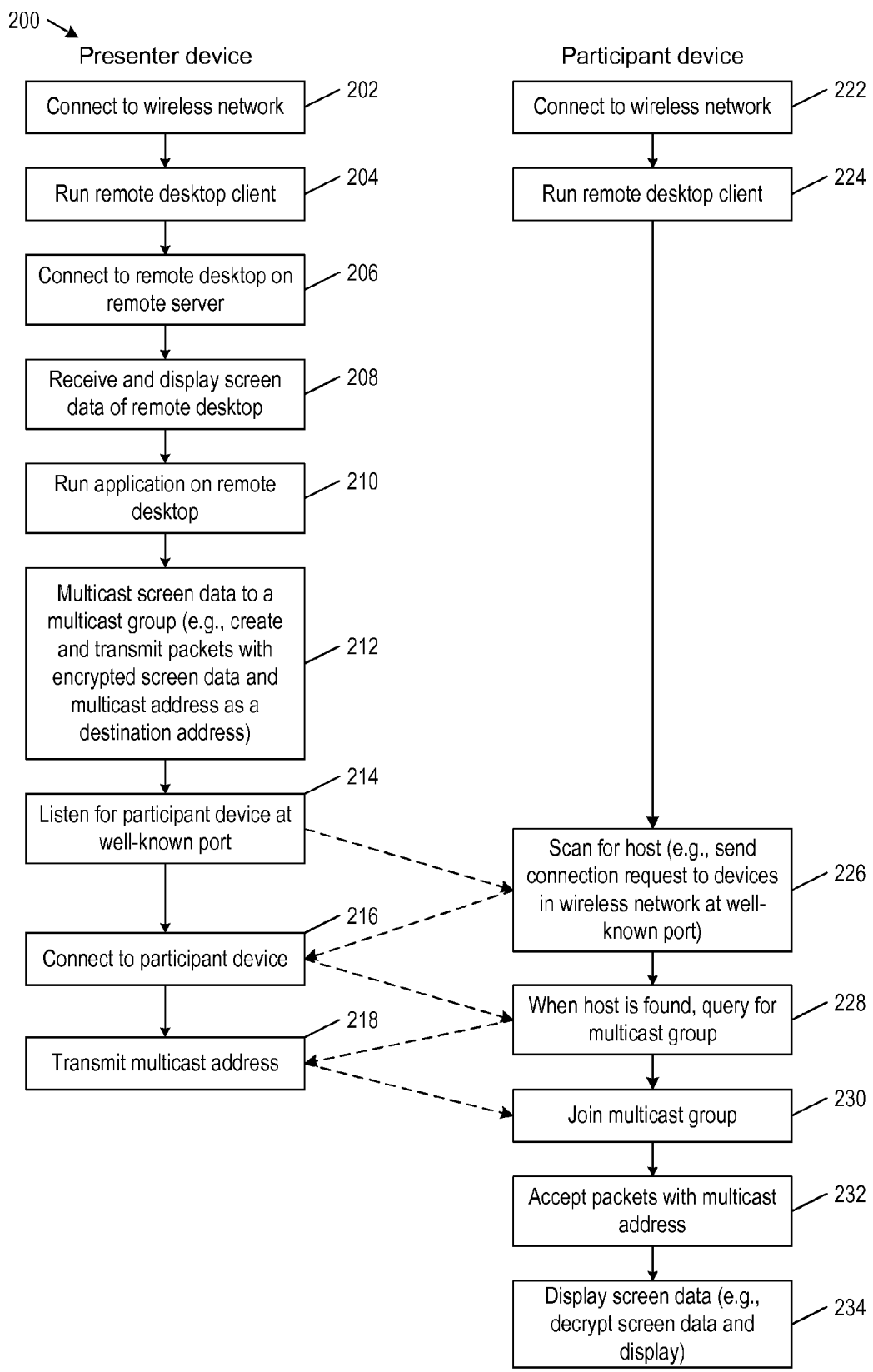
FIG. 2 is a swimlane flowchart of a method to screen sharing a remote desktop in a wireless environment in examples of the present disclosure.

FIG. 2 is a swimlane flowchart of a method 200 to implement screen sharing of a remote desktop in a wireless environment in examples of the present disclosure. The swimlane flowchart shows the blocks of presenter device 104-1 (FIG. 1) and a representative participant device 104-n (FIG. 1) in separate lanes where interactions between them are indicated with dashed arrows between the devices.

Presenter device 104-1 may begin in blocks 202. In block 202, presenter device 104-1 connects to wireless network 106 (FIG. 1). More specifically, presenter device 104-1 connects to wireless access point 102 (FIG. 1). Block 202 may be followed by block 204.

In block 204, presenter device 104-1 runs remote desktop client 110 (FIG. 1). This may be in response to instructions from a presenter. Block 204 may be followed by block 206. The following blocks are performed by presenter device 104-1 executing remote desktop client 110.

In block 206, presenter device 104-1 connects to remote desktop 112 (FIG. 1) on remote server 116 through wireless network 106. This allows the presenter to view the graphical user interface generated by remote desktop 112 and control applications running thereon from presenter device 104-1. Block 206 may be followed by block 208.

In block 208, presenter device 104-1 receives and displays screen data from remote desktop 112 through wireless network 106. Block 208 may be followed by block 210.

In block 210, presenter device 104-1 runs application 120 (FIG. 1) on remote desktop 112. This may be in response to inputs from the presenter. For example, the presenter uses application 120 to share slides with other meeting participants. Block 210 may be followed by block 212.

In block 212, presenter device 104-1 multicasts screen data of remote desktop 112 to a multicast group through wireless network 106. This may be in response to the presenter selecting to enter into the wireless multicast mode of remote desktop client 110 as a presenter device. In response, presenter device 104-1 selects a multicast address for the multicast group, creates multicast packets that carry the screen data and the multicast address as a destination address, and transmits the multicast packets through wireless network 106. For example, presenter device 104-1 transmits the multicast packets to wireless access point 102, which is capable of multicast routing and sends the multicast packets to the members of the multicast group. To ensure privacy, presenter device 104-1 may prompt the presenter for a passphrase, encrypt the screen data with the passphrase, and create the multicast packets with the encrypted screen data and the multicast address. The presenter may orally distribute the passphrase to the other meeting participants at the meeting. Block 212 may be followed by block 214.

In block 214, presenter device 104-1 listens for participant devices 104-2 to 104-n at a well-known port. Here well-known port refers to a designated port where remote desktop clients 100 and compatible wireless multicast applications are to connect and communicate the multicast address. Block 214 may be followed by block 216.

In block 216, assuming presenter device 104-1 receives a connection request from a participant device 104-n in a corresponding block 226 (described later), presenter device 104-1 connects to participant device 104-n at the well-known port through wireless network 106. Block 216 may be followed by block 218.

In block 218, assuming presenter device 104-1 receives an inquiry from participant device 104-n for the multicast group in a corresponding block 228 (described later), presenter device 104-1 transmits the multicast address for the multicast group to participant device 104-n through wireless network 106.

Participant device 104-n may begin in block 222. In block 222, participant device 104-n connects to wireless network 106. More specifically, participant device 104-n connects to wireless access point 102. Block 222 may be followed by block 224.

In block 224, participant device 104-n runs remote desktop client 110 or a compatible wireless multicast application. This may be in response to instructions from a participant. Block 224 may be followed by block 226. The following blocks are performed by participant device 104-n executing remote desktop client 110 or a compatible wireless multicast application.

In block 226, participant device 104-n scans for a presenter device, such as presenter device 104-1, through wireless network 106. This may be in response to the participant selecting to enter into the wireless multicast mode of remote desktop client 110 as a participant device. Note this may be the only mode of operation in a compatible wireless multicast application. In response, participant device 104-n sends connection requests to devices in wireless network 106 at the well-known port. Block 226 may be followed by block 228.

In block 228, after a presenter device is found, participant device 104-n transmits a query for the multicast group to the presenter device through wireless network 106. A presenter device is found when the presenter device connects to participant device 104-n, such as when presenter device 104-1 connects to participant device 104-n at the well-known port in corresponding block 216. Block 228 may be followed by block 230.

In block 230, after the multicast address is received, participant device 104-n transmits a join multicast group message identifying the multicast address through wireless network 106. For example, participant device 104-n transmits an Internet Group Management Protocol (IGMP) membership report including the multicast address to wireless access point 102, which is capable of multicast routing. Block 230 may be followed by block 232.

In block 232, participant device 104-n accepts multicast packets with the multicast address for the multicast group as the destination address through wireless network 106. Participant device 104-n may ignore multicast packets without the multicast address for the multicast group. Block 232 may be followed by block 234.

In block 234, participant device 104-n displays the screen data from the multicast packets. As discussed above, to ensure privacy, the screen data may be encrypted with a passphrase that the presenter orally distributes to the other participants at the meeting. In such a case, participant device 104-n may prompt the participant for the passphrase. Once the passphrase is received, participant device 104-n decrypts the screen data from the multicast packets and displays the screen data.

Figure 3:
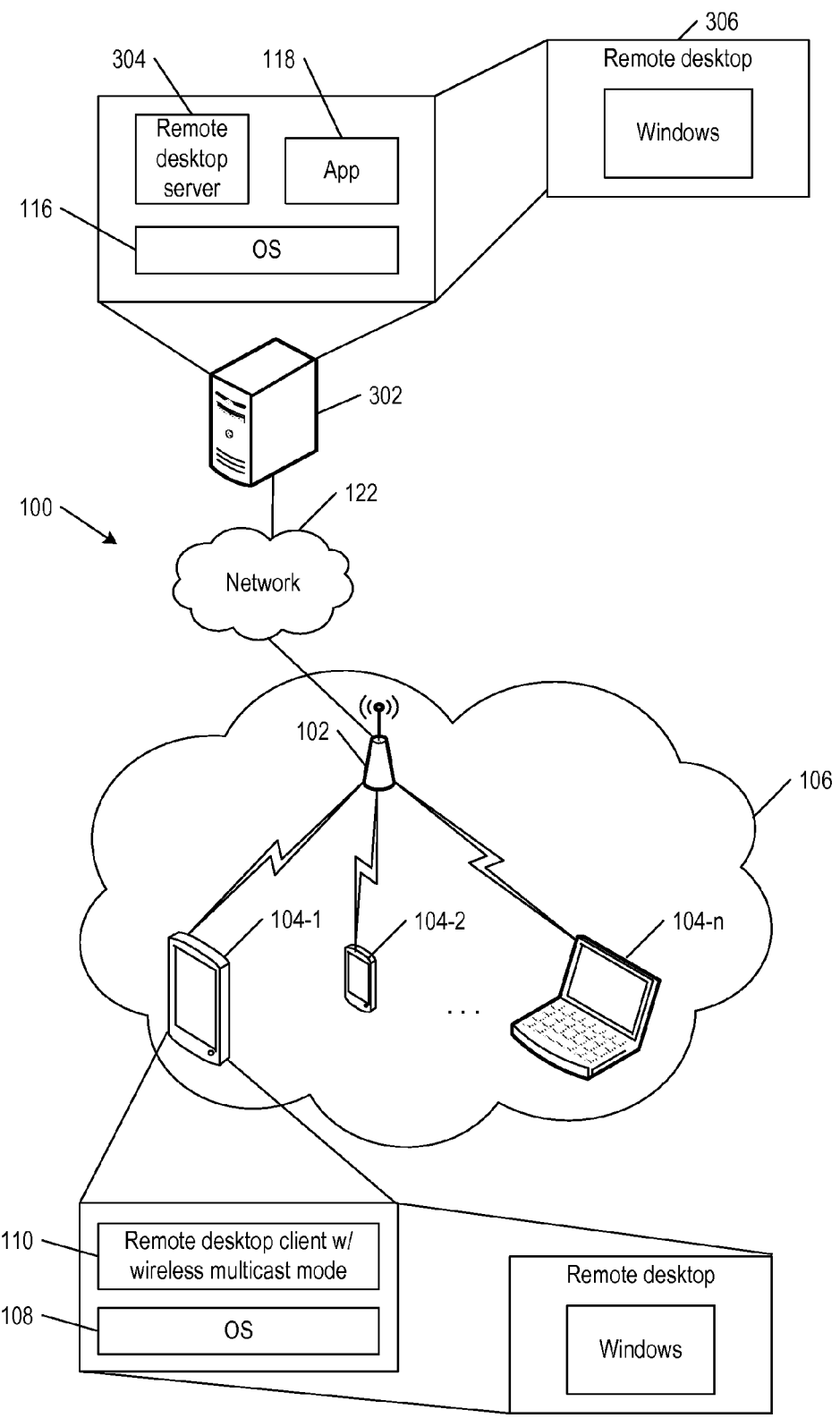
FIG. 3 is a block diagram illustrating a simplified view of a system to screen share a remote desktop on a physical computer in a wireless environment in examples of the present disclosure.

In addition to remote desktops running on VMs, method 200 may also be applied to remote desktops running on physical machines. As shown in FIG. 3, remote server 116 (FIG. 1) is replaced with a remote computer 302 running OS 118, application 120, and a remote desktop server 304. Remote desktop client 110 communicates with remote desktop server 304 to display and operate a remote desktop 306 from presenter device 104-1.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a presenter device to screen share a remote desktop on a remote server with participant devices in a wireless network including the presenter device and the participant devices, the method comprising:
   the presenter device connecting to the wireless network, the presenter device comprising a computer processor that is used to connect to the wireless network;
   the presenter device connecting to the remote desktop on the remote server through the wireless network by using the computer processor;
   the presenter device receiving screen data of the remote desktop through the wireless network by using the computer processor;
   the presenter device displaying the screen data on a display screen by using the computer processor;
   the presenter device multicasting the screen data to a multicast group through the wireless network by using the computer processor; and
   the presenter device transmitting a multicast address to the participant devices through the wireless network by using the computer processor, wherein the participant devices use the multicast address to receive the screen data through the wireless network.

2. The method of claim 1, further comprising, after the presenter device connecting to the remote desktop, the presenter device running an application on the remote desktop.

3. The method of claim 1, wherein the presenter device multicasting the screen data comprises:
   the presenter device creating multicast packets comprising the screen data and the multicast address as a destination address; and the presenter device transmitting the multicast packets to the wireless network.

4. The method of claim 3, wherein the presenter device creating multicast packets includes the presenter device encrypting the screen data.

5. The method of claim 1, before the presenter device transmitting a multicast address, further comprising:
the presenter device listening for the participants devices at a well-known port;
the presenter device receiving connection requests from the participant devices at the well-known port; and
the presenter device connecting to the participant devices.

6. The method of claim 5, after the presenter device connecting to the participant devices, further comprising:
presenter device receiving queries for the multicast group from the participant devices.

7. The method of claim 1, wherein the presenter device connecting to the wireless network comprises the presenter device connecting to a wireless access point of the wireless network and the wireless access point copies the screen data to the participant devices.

8. A method for a participant device to screen share a remote desktop of a presenter device in a wireless network including the participant device and the presenter device, the method comprising:
the participant device connecting to the wireless network, the participant device comprising a computer processor that is used to connect to the wireless network;
the participant device scanning for the presenter device through the wireless network by using the computer processor;
after the participant device finding the presenter device, the participant device receiving a multicast address from the presenter device through the wireless network by using the computer processor;
based on the multicast address, the participant device receiving a multicast of screen data of the remote desktop from the presenter device through the wireless network by using the computer processor; and
the participant device displaying the screen data on a display screen by using the computer processor.

9. The method of claim 8, wherein the participant device scanning for the presenter device through the wireless network comprises the participant device attempting to connect to devices in the wireless network using a well-known port, wherein the presenter device responds a connection request from the participant device.

10. The method of claim 8, before the participant device receiving a multicast address, further comprising the participant device transmitting a query for the multicast group to the presenter device.

11. The method of claim 8, wherein the participant device receiving a multicast of the remote desktop comprises the participant device accepting multicast packets comprising the multicast address as a destination address.

12. The method of claim 11, further comprising the participant device decrypting the screen data.

13. The method of claim 8, wherein the participant device receiving a multicast of the remote desktop comprises the participant device receiving multicast packets from a wireless access point of the wireless network and the wireless access point copies the multicast packets to participant devices including the participant device.

14. A system, comprising:
a wireless access point to implement a wireless network;
a presenter device comprising a computer processor configured to:
connect to the wireless access point;
connect to a remote desktop on a remote server through the wireless network;
receive screen data of the remote desktop through the wireless network;
display the screen data on a display screen of the presenter device;
multicast the screen data to a multicast group through the wireless network; and
transmitting a multicast address through the wireless network; and
a participant device comprising a computer processor configured to:
connect to the wireless access point;
receive the multicast address from the presenter device through the wireless network;
based on the multicast address, receive a multicast of the screen data from the presenter device through the wireless network; and
display the screen data on a display screen of the participant device.

15. The system of claim 14, wherein the presenter device multicasts the screen data by:
encrypting the screen data;
creating multicast packets comprising the encrypted screen data and the multicast address as a destination address; and
transmitting the multicast packets to the wireless network.

16. The system of claim 15, wherein the participant device is configured to decrypt the encrypted screen data.

17. The system of claim 14, wherein the participant device is configured to scan for the presenter device by attempting to connect to devices in the wireless network using a well-known port and, after finding the presenter device, to transmit a query for the multicast group to the presenter device.

18. The system of claim 17, wherein the presenter device is configured to:
listen at the well-known port;
receive a connection request from the participant device at the well-known port;
connect to the participant device; and
receive the query for the multicast group from the participant device.

19. The system of claim 14, wherein the participant device receives the multicast of the screen data by accepting multicast packets comprising the multicast address as a destination address.

20. The system of claim 14, wherein the wireless access point copies the screen data to the participant devices.

* * * * *